US008770389B2

(12) United States Patent
Millard et al.

(10) Patent No.: US 8,770,389 B2
(45) Date of Patent: Jul. 8, 2014

(54) VIBRATOR

(75) Inventors: Phillip Millard, Littlemore (GB); Tim Moulsdale, Bourne End (GB)

(73) Assignee: TNA Australia Pty Limited, Lidcombe, New South Wales (AU)

( * ) Notice: Subject to any disclaimer, the term of this patent is extended or adjusted under 35 U.S.C. 154(b) by 0 days.

(21) Appl. No.: 13/566,855

(22) Filed: Aug. 3, 2012

(65) Prior Publication Data

US 2013/0037389 A1 Feb. 14, 2013

(30) Foreign Application Priority Data

Aug. 12, 2011 (AU) ................................ 2011903236

(51) Int. Cl.
*B65G 27/24* (2006.01)
*B65G 27/28* (2006.01)

(52) U.S. Cl.
CPC ................ *B65G 27/24* (2013.01); *B65G 27/28* (2013.01)
USPC ............................ 198/769; 198/767; 198/760

(58) Field of Classification Search
USPC .......................................... 198/760, 767, 769
See application file for complete search history.

(56) References Cited

U.S. PATENT DOCUMENTS

| | | | | |
|---|---|---|---|---|
| 2,830,696 | A * | 4/1958 | Musschoot | 198/760 |
| 4,315,817 | A | 2/1982 | Popper | |
| 4,979,608 | A * | 12/1990 | Mikata et al. | 198/566 |
| 6,868,960 | B2 * | 3/2005 | Jones | 198/770 |
| 7,784,604 | B2 * | 8/2010 | Boeger et al. | 198/753 |
| 2007/0181405 | A1 | 8/2007 | Krell | |

FOREIGN PATENT DOCUMENTS

EP 2208693 A2 7/2010

OTHER PUBLICATIONS

British Patent Office Search Report Issued in Application No. GB1212315.4 on Nov. 5, 2012, 1 page.

* cited by examiner

*Primary Examiner* — Mark A Deuble
(74) *Attorney, Agent, or Firm* — Kilpatrick Townsend & Stockton LLP

(57) ABSTRACT

A vibrator (16) for the tray (10) of a vibratory conveyor (slip conveyor). The conveyor (16) includes bases 19 and 20 supported by resilient mountings (17, 18) on a stationary structure 37. Elongated resilient mountings (17, 18) extend between bases (19, 22), with the tray (10) supported on the base (23).

22 Claims, 5 Drawing Sheets

15
11
14
10
12
12
31
13
18
24
26
24
20
27
16
17
21

11
11
14
12
18
24
20
18
24
26
10
23
17
27
17
24
21

VIBRATOR

This application claims priority to the Australian Patent Application No. 2011903236, filed Aug. 12, 2011, the disclosure of which is incorporated by reference herein.

TECHNICAL FIELD

The present invention relates to vibrators and more particularly but not exclusively to vibrators employed in conveyors.

BACKGROUND OF THE INVENTION

A large variety of equipment employs vibrators to aid in the transfer of material. For example, vibratory conveyors and slip conveyors have a conveyor tray along which material is conveyed by vibration of the tray.

Known conveyors that employ vibrators have a number of disadvantages including:

(1) transfer of vibration to the supporting structure;

(2) imbalance of the assembly which results in inefficient operation and excessive wear; and (3) variations in vibrator constructions to accommodate variations in the construction of conveyors.

OBJECT OF THE INVENTION

It is the object of the present invention to overcome or substantially ameliorate at least one of the above disadvantages.

SUMMARY OF THE INVENTION

There is disclosed herein a vibrator to be secured to an item to vibrate the item, the vibrator including:

a first base to be secured to a supporting structure for movement relative thereto along a predetermined first path;

a first mounting secured to the first base and to be secured to the structure to provide for said relative movement, and to at least partly support the first base;

a second base to be secured to the supporting structure for movement relative thereto along a second path generally parallel to the first base path, and to be secured to the item;

a second mounting, the second mounting being secured to the second base and to be secured to the supporting structure to provide for the relative movement between the second base and supporting structure, and to at least partly support the second base;

a resilient coupling attached to the bases to provide for relative movement between the bases;

a motor operatively associated with the bases to cause the relative movement between the bases; and wherein the bases, coupling and motor cooperate to provide two mobile base assemblies that oscillate along a third path that is generally parallel to the first and second paths, and substantially in unison in opposite directions, with a first one of the base assemblies having a first mass and including said first base, and a second one of said base assemblies having a second mass and including said second base, with the first mass being greater than the second mass to enable the second base assembly to be secured to the item so that the second mass and item have a combined mass that is substantially equal to the first mass.

Preferably, each path is substantially linear.

Preferably, the resilient coupling is a plurality of resilient couplings, with the resilient couplings being elongated members, with the bases secured to end extremities of the couplings.

Preferably, each of the resilient couplings is longitudinally elongated in a direction generally perpendicular to each path.

Preferably, the motor is electromagnetic motor including an electro-magnet and an armature.

Preferably, the armature is attached to the first base and the electro-magnet attached to the second base.

Preferably, the vibrator has a natural frequency, with the motor being adapted to run at said natural frequency.

Preferably, each path is inclined to the horizontal.

Preferably, a centre of gravity, with the centres moving along a third path that is generally parallel to the first and second paths.

Preferably, there are four resiliently couplings, including a first pair of couplings and a second pair of couplings, the first pair of couplings being spaced in the direction of the paths from the second pair of couplings, with the couplings of each pair of couplings being spaced in a direction transverse of the first path.

Preferably, there are four mountings including a first pair of mountings and a second pair of mountings, the first pair of mountings being spaced in the direction of the first path from the second pair of mountings, while the couplings of each pair of couplings being spaced in a direction transverse of the first path.

Preferably, the first base assembly includes a weight that has a weight mass, with the weight being alterable to change the weight mass.

There is further disclosed herein, in combination the above vibrator, and the tray of a conveyor, with the tray including a bottom wall with a bottom surface with the vibrator attached to the bottom surface.

BRIEF DESCRIPTION OF THE DRAWINGS

A preferred form of the present invention will now be described by way of example with reference to the accompanying drawings wherein.

DETAILED DESCRIPTION OF THE PREFERRED EMBODIMENT

Figure 1:
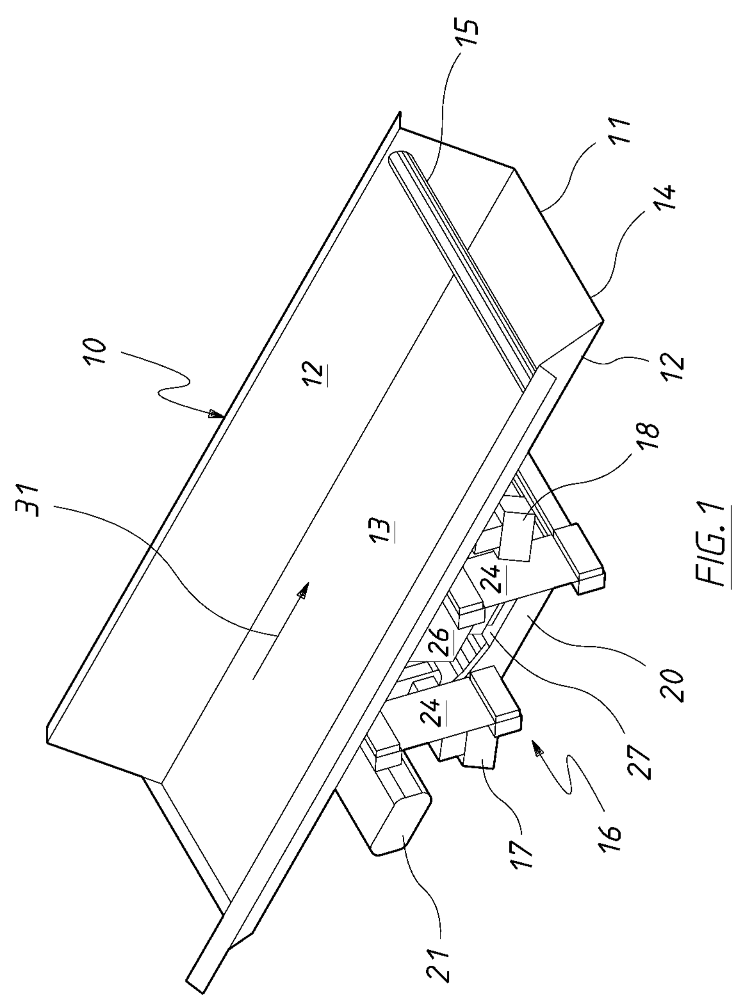
FIG. 1 is a schematic top isometric view of a conveyor tray and a vibrator attached thereto.

In FIGS. 1 to 4 of the accompanying drawings there is schematically depicted a tray 10 of a vibratory conveyor or slip conveyor. The tray 10 is one of a series of trays that would be arranged in series to convey material therealong in a desired direction. The tray 10 has a bottom wall 11 from which there upwardly diverges a pair of side walls 12. The bottom wall 11 and side walls 12 are longitudinally parallel and generally co-extensive. A brace 15 extends between the upper portions of the side walls 12. The bottom wall 11 has a top surface 13 upon which the material to be conveyed rest, and a lower surface 14.

Attached to the lower surface 14 is a vibrator 16.

The vibrator 16 is attached to a stationary supported structure 37 by means of a pair of lower mountings 17 and a pair of upper mountings 18. The mountings 17 and 18 are resilient to provide for movement of the vibrator 16 relative to the supporting structure 37.

The mountings 17 are attached to a first base 19 that includes a carriage 20. Attached to the carriage 20 are the mountings 17 and a weight 21.

The mountings 18 are attached to a second base 22 that includes a carriage 23 to which the mountings 18 are attached. The carriage 23 is fixed to the lower surface 14.

During movement of the bases 19 and 22, the mountings 17 and 18 resiliently deform and urge the bases 19 and 22 to a start (rest) position.

Extending between the carriages 20 and 23 are resilient couplings 24. In this embodiment the resilient couplings 24 are bands or strips that are longitudinally elongated so as to be inclined to the vertical. The carriages 20 and 23 are secured to end extremities of the couplings 24. During movement of the bases 19 and 22, the couplings 24 resiliently deform and urge the bases 19 and 22 to the start positions.

Operatively associated with the carriages 20 and 23 is a motor 25. In this embodiment, the motor 25 is an electromagnetic motor including an electro-magnet 26 and an armature 27. When the electro-magnet 26 is energised, the armature 27 and electro-magnet 26 are urged toward each other. This causes movement of the carriages 20 and 23 toward each other, with deform of the mountings 17 and 18, and couplings 24 resulting.

Preferably, the armature 27 is fixed to the carriage 20, while the electro-magnet 26 is fixed to the carriage 23.

A base assembly 38, including the base 19 together with the weight 21 and armature 27, has a centre of gravity 28. A base assembly 39, including the base 22 together with the items attached thereto, such as the electro-magnet 26 and tray 10, has a centre of gravity 29. When the electro-magnet 26 is cyclically energised, the bases 19 and 22 are caused to move, relative to each other and relative to the supporting structure 37, so that the centres of gravity 28 and 29 are moved longitudinally along the predetermined path 30 that is substantially linear. In that regard it should be appreciated the mountings 17 and 18 are configured to provide for the movement along the path 30.

Figure 2:
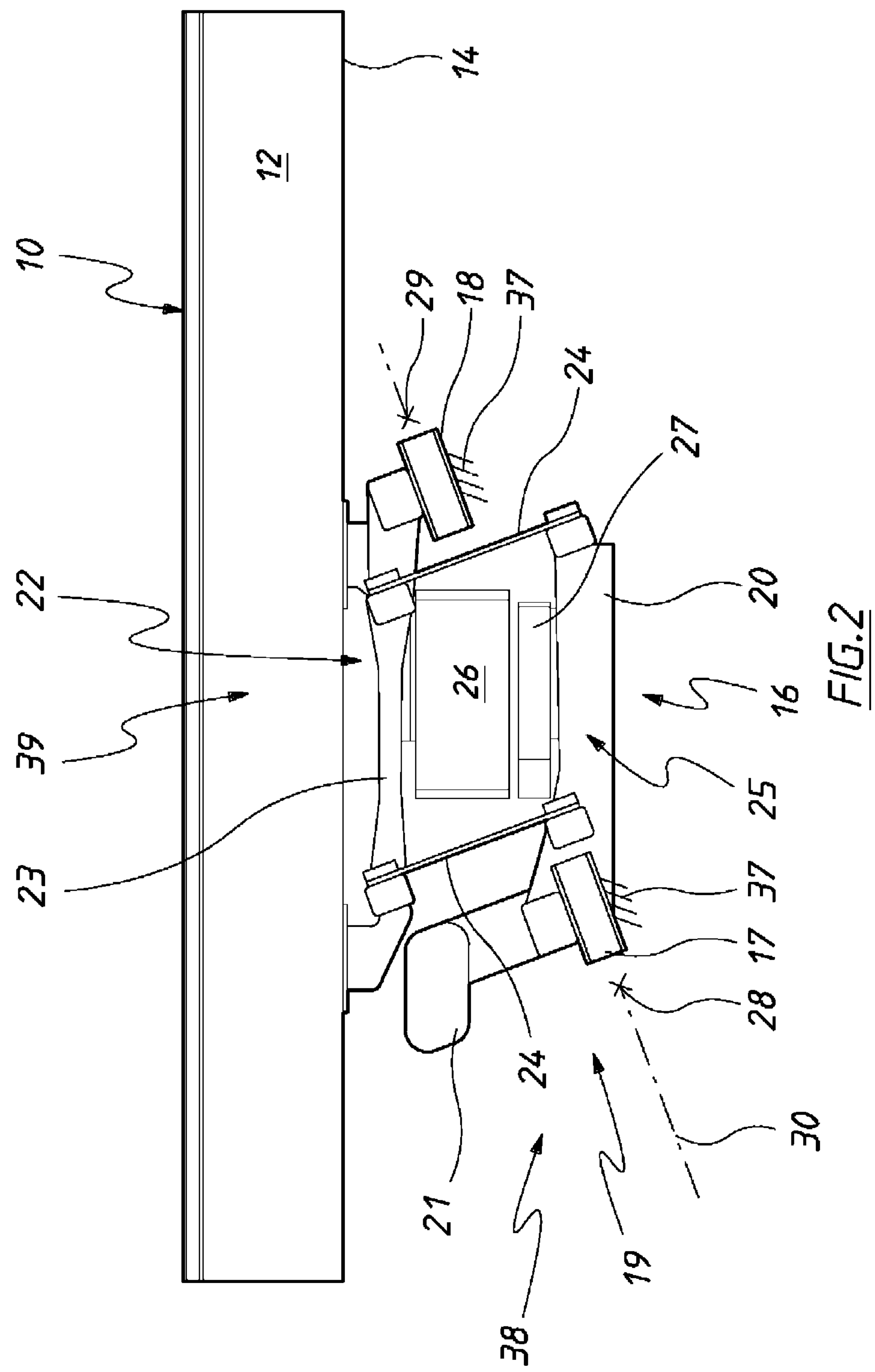
FIG. 2 is a schematic side elevation of the vibrator and tray of FIG. 1.
Figure 3:
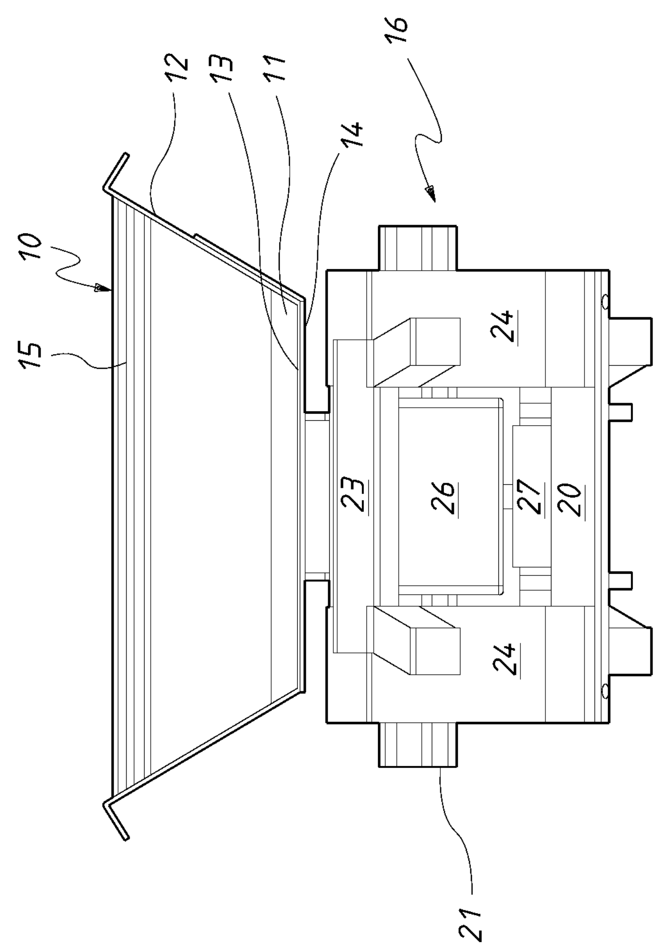
FIG. 3 is a schematic end elevation of the vibrator and tray of FIGS. 1 and 2.

The resilient couplings 24 are longitudinally elongated so as to be generally perpendicular to the path 30. As best seen in FIG. 2, the couplings 24 are generally transverse relative to the path 30.

Figure 4:
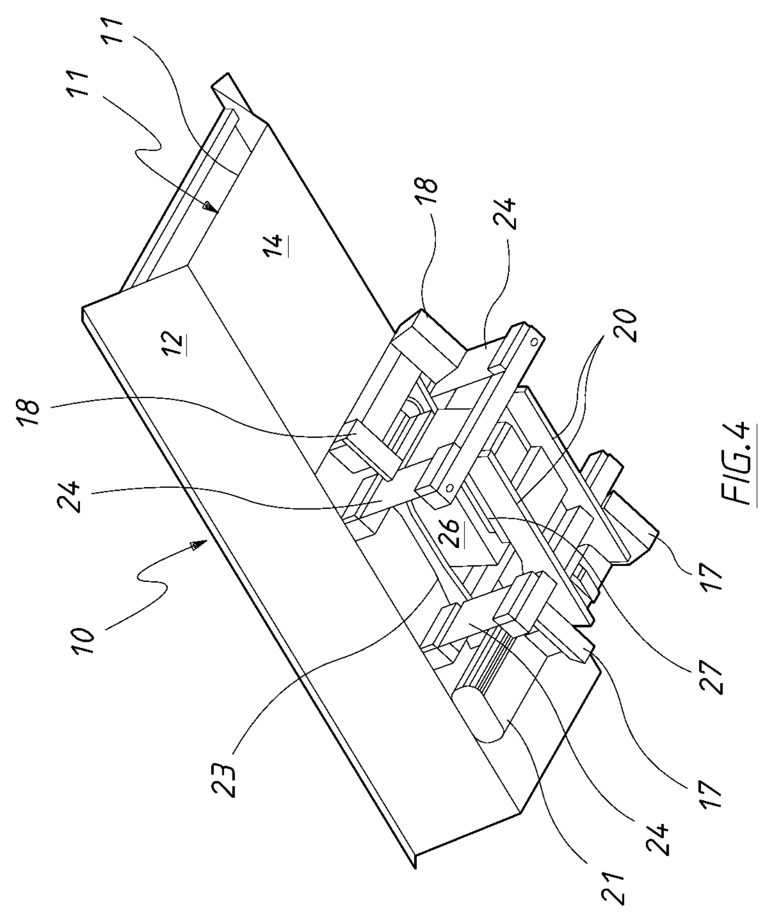
FIG. 4 is a schematic isometric view of the tray and vibrator of FIGS. 1 to 3.

The mountings 17 and 18, as best seen in FIG. 4 include a first pair 17 and a second pair 18. The pair of mountings 18 are spaced from the pair of mountings 17 in the direction of the path 30. The mountings 17 are spaced in a direction transverse of the paths 30, as are the mountings 18.

The resilient couplings 24 include a first pair of resilient couplings 24 located on one side of the motor 22, and a second pair of resilient couplings 24 located on the other side of the motor 22. The first pair of couplings 24 are located from the second pair of couplings 24 in the direction of the path 30. The first pair of couplings 24 are spaced in a direction transverse of the path 30, as are the pair of couplings of the second pair of couplings 24.

When the electro-magnet 26 is cyclically energised, the bases 19 and 22 each move in unison in opposite directions along a path generally parallel to the path 30. A similar motion is applied to the tray 10 by the vibrator 16, that is the tray 10 is caused to move along a path generally parallel to the path 30.

The resilience of the couplings 24 and the mountings 17 and 18 cooperate so that the vibrator 16 operates at a natural frequency. As a particular example, the frequency might be 25 hz. This is also determined by the frequency at which the electro-magnet 26 is energised. When the tray 10 is vibrated, the tray 10 moves upwardly and forwardly in the direction 31 to move the material being conveyed in the direction 31.

The mass of the first base assembly 38 (base 19, and the item fixed thereto such as the weight 21 and armature 27) has a greater mass than the mass of the second base assembly 39 (the base 22 and items fixed thereto such as the electro-magnet 26). This enables the tray 10 to be fixed to the base 22 so that the tray 10 and second base assembly 39 have a combined mass about the same as the mass of the first base assembly 38.

Figure 5:
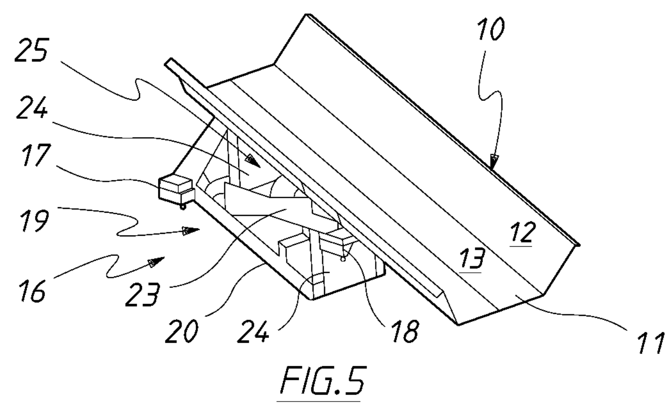
FIG. 5 is a schematic top isometric view of a modification of the vibrator of FIGS. 1 to 4.
Figure 6:
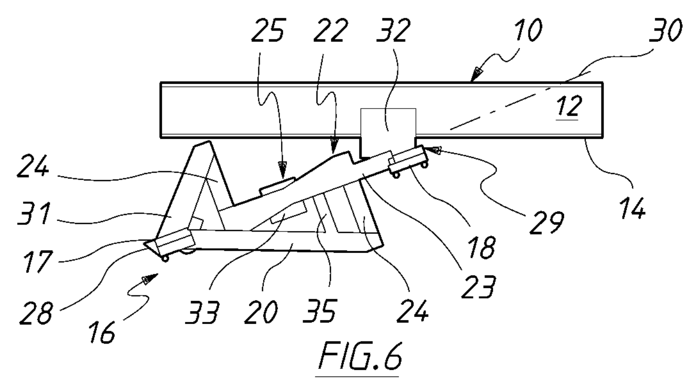
FIG. 6 is a schematic side elevation of the vibrator of FIG. 5.
Figure 7:
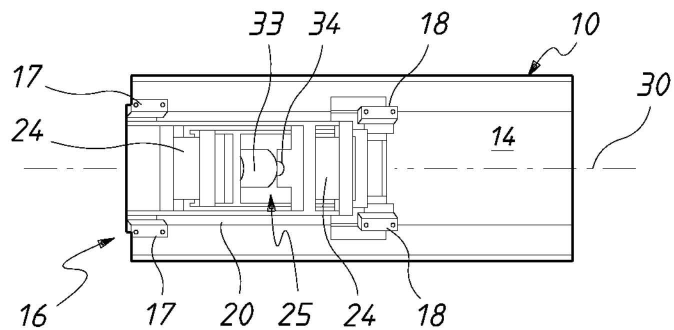
FIG. 7 is a schematic bottom plan view of the vibrator of FIG. 5.

In the embodiment of FIGS. 5 to 7, the vibrator 16 is a modification of the vibrator 16 of the previous embodiment. In this embodiment the carriage 20 includes an upwardly extending bracket 31, with the resilient coupling 24 extending downwardly from an upper portion of the bracket 31 to a forward portion of the carriage 23.

The upper end of the carriage 23 is provided with a flange 32 that is shaped to receive and is fixed to the tray 10.

The motor 25 is of a cylindrical configuration. In one preferred form the motor 25 would include a main cylindrical body attached to the carriage 23 and a rod attached to the carriage 20. In a particular preferred form, the modified motor 25 would be an electro-magnetic motor having an electro-magnet 33 attached to the carriage 23, and an armature 34 (rod) attached to the carriage 20 by means of an extension 35 of the carriage 20. When electrically energised the electro-magnet 33 would cause reciprocation of the armature 34 along the axis 36 with reciprocation of the centres of gravity 28 and 29 along the linear path provided by the axis 34. Alternatively the electro-magnet 33 would be attached to the carriage 20 and the rod 34 attached to the carriage 23.

In the above described preferred embodiments, the path 30 would pass midway between the mountings 17 and the mountings 18.

The above described preferred embodiments have a number of advantages including the conveyor 16 providing a modular construction for a conveyor. In particular the weight 21 can be adjusted to accommodate different masses of the tray 10. A further advantage is that by oscillating the centres of gravity 28 and 29 along the path 30, less vibration is transferred to the supporting structure.

The invention claimed is:

1. A vibrator configured to be secured to an item to vibrate the item, the vibrator comprising:

a first base configured to be secured to a supporting structure for movement relative thereto along a predetermined first path;

a first mounting secured to the first base and configured to be secured to the structure to provide for said relative movement, and to at least partly support the first base;

a second base configured to be secured to the supporting structure for movement relative thereto along a second path generally parallel to the first path, and further configured to be secured to the item;

a second mounting, the second mounting being secured to the second base and configured to be secured to the supporting structure to provide for the relative movement between the second base and supporting structure, and to at least partly support the second base;

at least one resilient coupling attached to both the first base and the second base, wherein the resilient coupling extends between the first base and the second base, to provide for relative movement between the bases;

a motor operatively associated with the bases to cause the relative movement between the bases; and wherein the bases, coupling, and motor cooperate to provide two mobile base assemblies that oscillate along a third path that is generally parallel to the first and second paths, and substantially in unison in opposite directions, wherein a first one of the base assemblies has a first mass and comprises said first base, and a second one of said base assemblies has a second mass and comprises said second base, wherein the first mass is greater than the second mass to enable the second base assembly to be secured to the item, so that the second mass and item have a combined mass that is substantially equal to the first mass.

2. The vibrator of claim 1, wherein each path is substantially linear.

3. The vibrator of claim 1, wherein the at least one resilient coupling is at least two resilient couplings, wherein the resilient couplings are elongated members, wherein the first base is secured to a first end extremity of a first one of the couplings and to a first end extremity of a second one of the couplings, and wherein the second base is secured to a second end extremity of the first one of the couplings and to a second end extremity of the second one of the couplings.

4. The vibrator of claim 1, wherein the resilient coupling is longitudinally elongated in a direction generally perpendicular to the paths and extends longitudinally between the first base and the second base.

5. The vibrator of claim 1, wherein the motor is an electromagnetic motor comprising an electro-magnet and an armature.

6. The vibrator of claim 5, wherein the armature is attached to the first base and the electro-magnet is attached to the second base.

7. The vibrator of claim 1, wherein the vibrator has a natural frequency, wherein the motor is configured to run at said natural frequency.

8. The vibrator of claim 1, wherein each path is inclined to the horizontal.

9. The vibrator of claim 1, wherein each base assembly comprises a center of gravity, wherein the centers move along a third path that is generally parallel to the first and second paths.

10. The vibrator of claim 1, wherein the at least one resilient coupling comprises a first pair of couplings and a second pair of couplings, the first pair of couplings being spaced in the direction of the paths from the second pair of couplings, with the couplings of each pair of couplings being spaced in a direction transverse of the first path.

11. The vibrator of claim 1, wherein the first mounting is a first pair of mountings and wherein the second mounting is a second pair of mountings, the first pair of mountings being spaced in the direction of the first path from the second pair of mountings.

12. The vibrator of claim 1, wherein the first base assembly further comprises a weight that has a weight mass, wherein the weight is modular and interchangeable, such that the weight can be selected and replaced so that the weight mass is a desired weight mass.

13. In combination, the vibrator of claim 1, and said item, wherein said item is a tray of a conveyor, wherein the tray comprises a bottom wall comprising a bottom surface, wherein the vibrator is attached to the bottom surface.

14. In combination, the vibrator of claim 1, and said item, wherein said item is a tray for a conveyor, and wherein said tray has a tray mass, wherein the combined mass is the second mass plus the tray mass.

15. The combination of claim 13, further comprising the conveyor, wherein the conveyor comprises said tray.

16. The combination of claim 14, further comprising the conveyor, wherein the conveyor comprises said tray.

17. The vibrator of claim 1, wherein the at least one resilient coupling is a plurality of resilient couplings, wherein the resilient couplings are elongated members, wherein the first base is secured to a first end extremity of a first one of the couplings and to a first end extremity of a second one of the couplings, and wherein the second base is secured to a second end extremity of the first one of the couplings and to a second end extremity of the second one of the couplings, and wherein each of the resilient couplings is longitudinally elongated in a direction generally perpendicular to the paths.

18. The vibrator of claim 17, wherein the motor is an electromagnetic motor comprising an electro-magnet and an armature, wherein the armature is attached to the first base and the electro-magnet is attached to the second base.

19. The vibrator of claim 18, wherein the vibrator has a natural frequency, wherein the motor is configured to run at said natural frequency.

20. The vibrator of claim 19, wherein each path is inclined to the horizontal.

21. The vibrator of claim 4, wherein the at least one resilient coupling is a plurality of resilient couplings, wherein each of the resilient couplings is longitudinally elongated so as to extend longitudinally between the first base and the second base, wherein each of the couplings extends in the direction generally perpendicular to said paths, and wherein the first base assembly further comprises a weight whose mass is selected depending on the mass of the item.

22. A vibrator configured to be secured to an item to vibrate the item relative to a structure, wherein the item has an item mass $m_{item}$, the vibrator comprising:

a first base assembly, comprising a first base, wherein the first base assembly has a first base assembly mass $m_1$;

a first mounting secured to the first base and configured to be secured to the structure to provide for movement of the first base relative to the structure along a first path;

a second base assembly, comprising a second base configured to be secured to the item, wherein the second base assembly has a second base assembly mass $m_2$;

a second mounting secured to the second base and configured to be secured to the structure to provide for movement of the second base relative to the structure along a second path, wherein the second path is generally parallel to the first path;

a resilient coupling, attached to at least one of the first base and the second base, to provide for relative movement between the bases; and a motor operatively associated with the bases to cause the relative movement between the bases;

wherein $m_1 \approx m_{item} + m_2$.

* * * * *